United States Patent [19]
Morishima et al.

[11] Patent Number: 5,875,055
[45] Date of Patent: Feb. 23, 1999

[54] STEREOSCOPIC IMAGE DISPLAY METHOD AND STEREOSCOPIC IMAGE DISPLAY APPARATUS USING THE SAME

[75] Inventors: Hideki Morishima, Kawasaki; Jun Tokumitsu, Sagamihara; Hiroaki Hoshi, Yokohama; Naosato Taniguchi, Urawa; Toshiyuki Sudo; Kazutaka Inoguchi, both of Kawasaki, all of Japan

[73] Assignee: Canon Kabushiki Kaisha, Tokyo, Japan

[21] Appl. No.: 674,591

[22] Filed: Jun. 26, 1996

[30] Foreign Application Priority Data

Jun. 29, 1995 [JP] Japan .................................. 7-188672

[51] Int. Cl.[6] .......................... G02B 27/26; G02B 27/22; H04N 9/47; H04N 13/04
[52] U.S. Cl. .......................... 359/465; 359/464; 359/462; 348/57; 348/58; 349/15
[58] Field of Search ..................... 359/462, 463, 359/464, 465; 349/15; 348/57, 58

[56] References Cited

U.S. PATENT DOCUMENTS

| 2,631,496 | 8/1947 | Rehorn ..................................... 359/463 |
| 5,113,285 | 3/1992 | Franklin et al. ......................... 359/465 |
| 5,264,964 | 11/1993 | Faris ........................................ 359/465 |
| 5,686,975 | 11/1997 | Lipton ..................................... 359/465 |

Primary Examiner—Cassandra C. Spyrou
Assistant Examiner—Audrey Chang
Attorney, Agent, or Firm—Morgan & Finnegan, LLP

[57] ABSTRACT

A stereoscopic image display method using a display, a phase shift member and a polarization optical element, two different types of vertically elongated stripe-shaped polarization plates having orthogonal optical axes, includes the steps of displaying, on the display, a single stripe image which is synthesized in such a manner that right and left parallax images from a parallax image source are divided into stripe pixels, and the stripe pixels of the right and left parallax images are arranged in a predetermined order, and controlling a direction of polarization of light transmitted through the phase shift member by controlling the electrical signal to be applied to the phase shift member in synchronism with the display operation of the stripe image.

14 Claims, 15 Drawing Sheets

VOLTAGE-OFF

VOLTAGE-ON

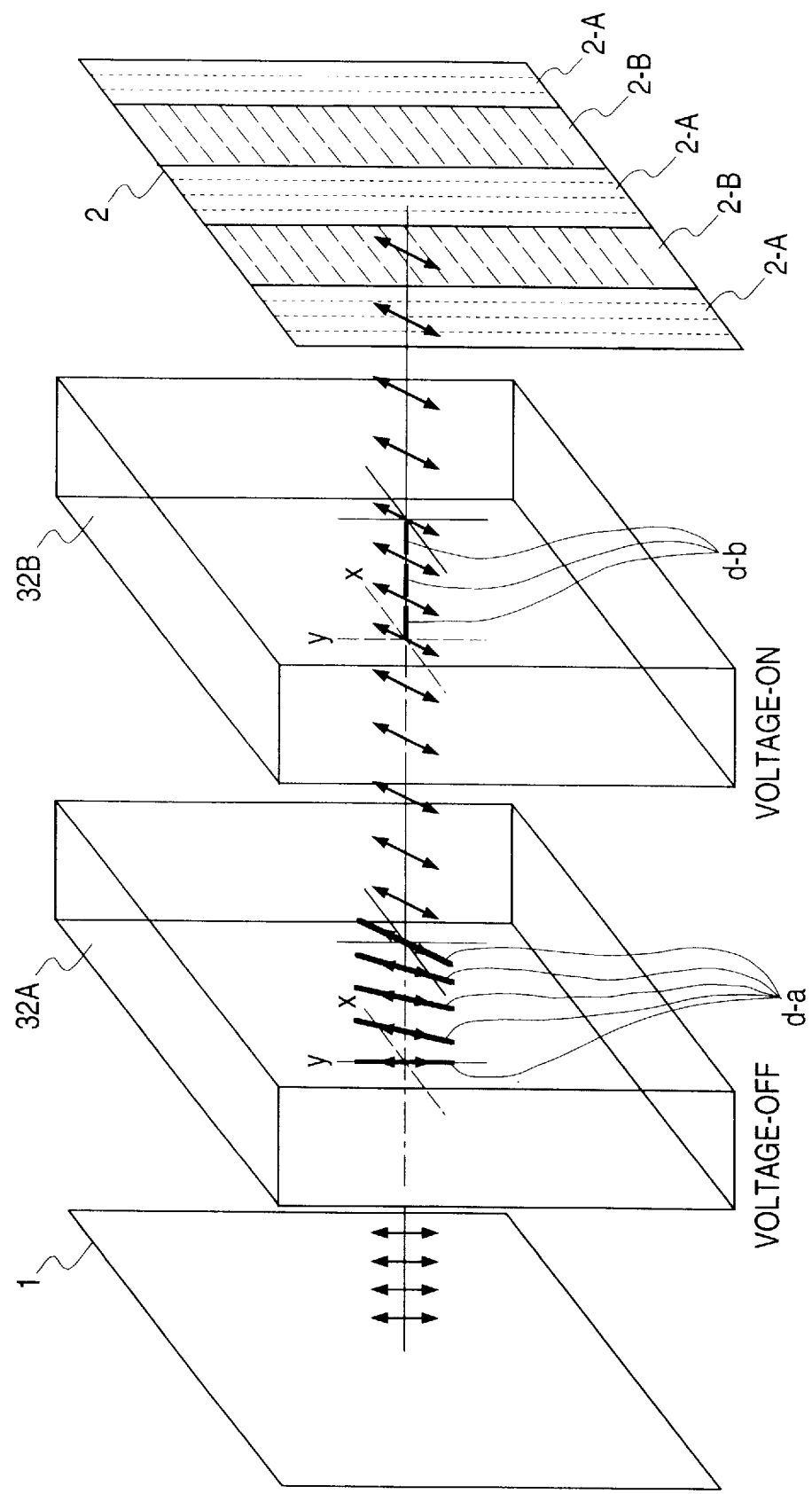

STEREOSCOPIC IMAGE DISPLAY METHOD AND STEREOSCOPIC IMAGE DISPLAY APPARATUS USING THE SAME

BACKGROUND OF THE INVENTION

1. Field of the Invention

The present invention relates to a stereoscopic image display method and a stereoscopic image display apparatus using the same and, more particularly, to a stereoscopic image display method, which utilizes a parallax barrier method, and a stereoscopic image display apparatus using the same.

2. Related Background Art

A stereoscopic image can be displayed by displaying parallax images picked up from different view points on the right and left eyes of an observer. In order to display different parallax images on the right and left eyes, a method of directly projecting different parallax images onto the right and left eyes like in a so-called HMD (Head Mounted Display or Helmet Mounted Display) method, a method of separating right and left images using polarized light, and making the observer view the separated images using polarization spectacles, a method of separating right and left images using a parallax barrier, and the like have been proposed.

The technique of stereoscopic image display using the parallax barrier method is disclosed by S. H. Kaplan, "Theory of Parallax Barriers", J. SMPTE, Vol. 59, No. 7, pp. 11–21, 1952. FIG. 16 is an explanatory view of the conventional stereoscopic image display method based on the parallax barrier method. In this method, two, right and left parallax images $R_S$ and $L_S$ picked up from different view points are divided into stripe-shaped pixels, and a stripe image is synthesized by extracting and alternately arranging the stripe-shaped pixels. The synthesized stripe image is displayed on the display surface of a display 101. A parallax barrier 102 is formed by arranging, in the horizontal direction, a large number of aperture portions and light-shielding portions each having a predetermined width, at a position separated by a distance T from the display surface. The observer observes the stripe image via the parallax barrier 102 from the positions of his or her right and left eyes $E_R$ and $E_L$. As a result, the observer observes the original parallax images $R_S$ and $L_S$ with his or her right and left eyes, thus realizing stereoscopic viewing.

However, in the HMD method or the method using polarization spectacles, the observer must wear an HMD device, polarization spectacles, or the like, which are not normally required.

On the other hand, the conventional method using a parallax barrier does not require any special member such as polarization spectacles. However, when the right and left parallax images are displayed, the number of display pixels is halved, resulting in a low resolution.

SUMMARY OF THE INVENTION

It is an object of the present invention to provide a stereoscopic image display method, which can display a stereoscopic image with high resolution while reducing crosstalk and moiré, can simultaneously display images including both a stereoscopic image and a two-dimensional image with high resolution, or can display a two-dimensional image free from flicker with high resolution, and a stereoscopic image display apparatus using the same.

In order to achieve the above object, according to one aspect of the present invention, there is provided a stereoscopic image display method having a display for emitting light consisting of predetermined polarized light, a phase shift member which is arranged at a predetermined position in front of the display, and sets transmitted light in one of two different phase shift states in accordance with an electrical signal, and a polarization optical element which is arranged at a predetermined position in front of the phase shift member and is constituted by alternately arranging, in a horizontal direction, two different types of vertically elongated stripe-shaped polarization plates having orthogonal optical axes, comprising the steps of:

displaying, on the display, a single stripe image which is synthesized in such a manner that right and left parallax images from a parallax image source are divided into stripe pixels, and the stripe pixels of the right and left parallax images are arranged in a predetermined order; and controlling a direction of polarization of light transmitted through the phase shift member by controlling the electrical signal to be applied to the phase shift member in synchronism with the display operation of the stripe image.

The method further comprises the step of displaying, on the display, a stripe image synthesized by alternately arranging odd order stripe pixels of the stripe pixels obtained by dividing the right parallax image and even order stripe pixels of the stripe pixels obtained by dividing the left parallax image, and thereafter, displaying, on the display, a stripe image synthesized by alternately arranging even order stripe pixels of the stripe pixels obtained by dividing the right parallax image and odd order stripe pixels of the stripe pixels obtained by dividing the left parallax image.

The two different phase shift states set by the phase shift member include a phase shift state in which the direction of polarization of predetermined linearly polarized light rotates through a first predetermined angle when the predetermined linearly polarized light is transmitted through the phase shift member, and a phase shift state in which the direction of polarization of predetermined linearly polarized light rotates through a second predetermined angle when the predetermined linearly polarized light is transmitted through the phase shift member.

The first predetermined angle is substantially 90° and the second predetermined angle is substantially 0°.

The phase shift member comprises first and second phase shift elements which are arranged in a back-and-forth direction with respect to the display and set transmitted light in two different phase shift states in accordance with electrical signals, and the two different phase shift states set by each of the first and second phase shift elements include a phase shift state in which the direction of polarization of predetermined linearly polarized light rotates through substantially 45° when the predetermined linearly polarized light is transmitted through the phase shift element, and a phase shift state in which the direction of polarization of predetermined linearly polarized light is left unchanged when the predetermined linearly polarized light is transmitted through the phase shift element.

The method further comprises the step of independently applying electrical signals to the first and second phase shift elements.

The phase shift member is divided into a plurality of regions, and the method further comprises the step of independently applying electrical signals to the divided regions.

According to another aspect of the present invention, there is provided a stereoscopic image display method, in which parallax images for right and left eyes from a parallax image source are divided into a plurality of stripe pixels, a stripe image obtained by arranging the plurality of stripe pixels in a horizontal direction in a predetermined order is displayed on a display, a light beam which comes from the stripe image displayed on the display and has a plane of polarization in a predetermined direction is guided to a polarization optical element constituted by arranging, in the horizontal direction, vertically elongated stripe-shaped polarization plates so that adjacent polarization plates have orthogonal optical axes, via a phase shift member which selectively sets incident light in one of two different phase shift states in accordance with an electrical signal and outputs the light, and the stripe image displayed on the display is observed using the light beam transmitted through the polarization optical element, comprising the steps of:

changing the stripe image to be displayed on the display; and changing the polarization state of the light beam transmitted through the phase shift member by controlling the electrical signal to be applied to the phase shift member in synchronism with the step of changing the polarization state.

According to one aspect of the present invention, there is provided a stereoscopic image display apparatus comprising:

a display for emitting light consisting of predetermined polarized light;

a phase shift member which is arranged at a predetermined position in front of the display, and sets transmitted light in one of two different phase shift states in accordance with an electrical signal;

a polarization optical element which is arranged at a predetermined position in front of the phase shift member and is constituted by alternately arranging, in a horizontal direction, two different types of vertically elongated stripe-shaped polarization plates having orthogonal optical axes;

a parallax image source for outputting right and left parallax images;

image processing means for dividing the right and left parallax images into stripe pixels, and displaying, on the display, a stripe image synthesized by arranging odd order stripe pixels of the stripe pixels obtained by dividing the right parallax image and even order stripe pixels of the stripe pixels obtained by dividing the left parallax image, or displaying, on the display, a stripe image synthesized by alternately arranging even order stripe pixels of the stripe pixels obtained by dividing the right parallax image and odd order stripe pixels of the stripe pixels obtained by dividing the left parallax image;

phase shift member drive means for applying the electrical signal to the phase shift member; and control means for controlling the image processing means to divide the right and left parallax images from the parallax image source into the stripe pixels and to display, on the display, a single stripe image synthesized by arranging the stripe pixels in a predetermined order, and controlling a direction of polarization of light transmitted through the phase shift member in synchronism with the display operation of the stripe image by controlling the electrical signal to be applied to the phase shift member using the phase shift member drive means.

The two different phase shift states set by the phase shift member include a phase shift state in which the direction of polarization of predetermined linearly polarized light rotates through a first predetermined angle when the predetermined linearly polarized light is transmitted through the phase shift member, and a phase shift state in which the direction of polarization of predetermined linearly polarized light rotates through a second predetermined angle when the predetermined linearly polarized light is transmitted through the phase shift member.

The first predetermined angle is substantially 90° and the second predetermined angle is substantially 0°.

The phase shift member comprises first and second phase shift elements which are arranged in a back-and-forth direction with respect to the display and set transmitted light in two different phase shift states in accordance with electrical signals, and the two different phase shift states set by each of the first and second phase shift elements include a phase shift state in which the direction of polarization of predetermined linearly polarized light rotates through substantially 45° when the predetermined linearly polarized light is transmitted through the phase shift element, and a phase shift state in which the direction of polarization of predetermined linearly polarized light is left unchanged when the predetermined linearly polarized light is transmitted through the phase shift element.

The phase shift member drive means comprises means for independently applying electrical signals to the first and second phase shift elements.

The phase shift member is divided into a plurality of regions, and the phase shift member drive means comprises means for independently applying electrical signals to the divided regions.

The embodiments of the present invention will become apparent from some embodiments to be described below.

BRIEF DESCRIPTION OF THE DRAWINGS

FIG. 14 is an explanatory view of the operation for displaying a two-dimensional image in the third embodiment;

DETAILED DESCRIPTION OF THE PREFERRED EMBODIMENTS

Figure 1:
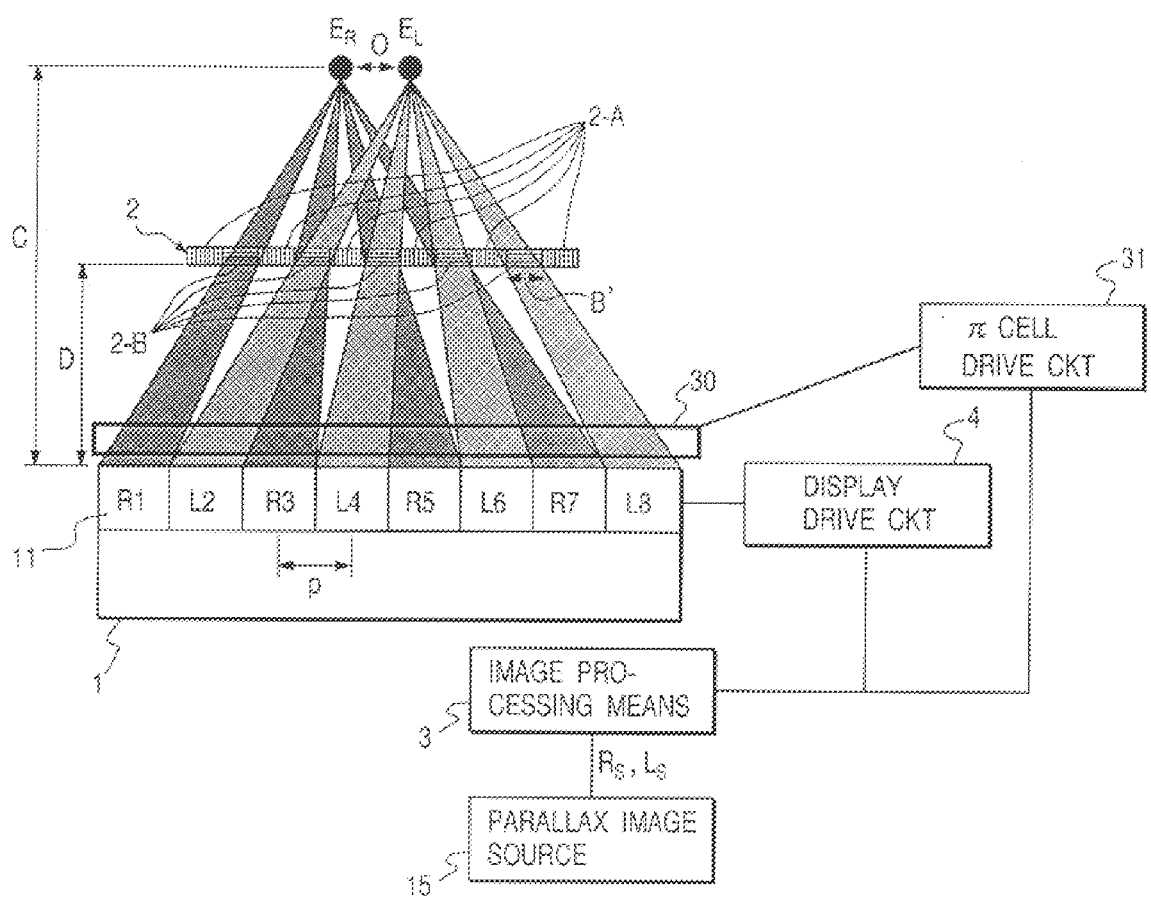
FIG. 1 is a schematic diagram showing principal part of a stereoscopic image display apparatus according to the first embodiment of the present invention.
Figure 2A:
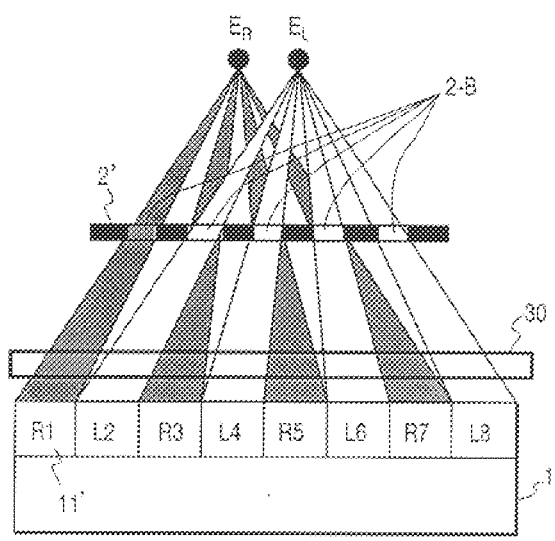
FIGS. 2A and 2B are explanatory views of the stereoscopic image display method in the first embodiment.
Figure 2B:
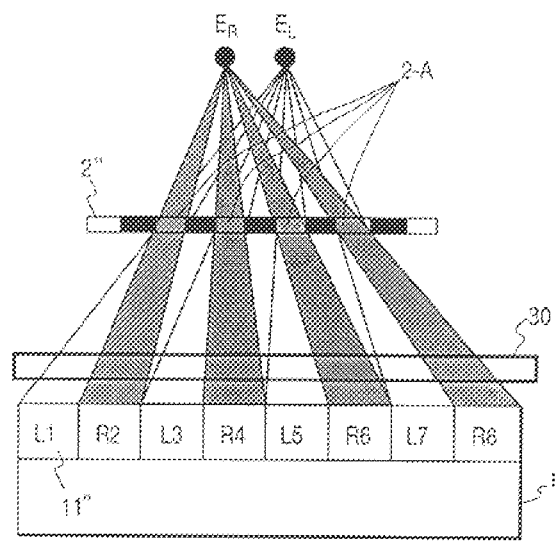

FIG. 1 is a schematic diagram showing principal part of a stereoscopic image display apparatus according to the first embodiment of the present invention. FIGS. 2A and 2B are explanatory views of the stereoscopic image display method in the first embodiment. FIGS. 2A and 2B are plan views when the apparatus of this embodiment is viewed from the top. In FIGS. 1, 2A, and 2B, a display 1 comprises an LCD display having a backlight light source. A stripe image 11 represents the state of a stereoscopic image to be displayed on the image display screen of the display 1. The display 1 is arranged so that light emitted thereby becomes linearly polarized light that vibrates in a direction perpendicular to the plane of the drawing of FIG. 1. When the display 1 comprises an LCD, linearly polarized light can be realized by setting the polarization plate used in the LCD in a predetermined direction. On the other hand, when the display 1 comprises a CRT, linearly polarized light is realized by arranging a polarization plate in front of the display screen of the CRT.

A polarization optical element 2 is constituted by alternately arranging, in the horizontal direction, two different vertically elongated, stripe-shaped polarization plates whose axes of polarization (the optical axes of the polarization plates) are perpendicular to each other, i.e., polarization plates 2-A which transmit polarized light that vibrates in the direction perpendicular to the plane of the drawing of FIG. 1, and polarization plates 2-B which transmit polarized light that vibrates in a direction parallel to the plane of the drawing of FIG. 1. The polarization optical element 2 serves as a parallax barrier with predetermined aperture portions.

A phase shift member 30, i.e., a so-called π cell, is constituted by a TN liquid crystal. The phase shift member 30 provides two different phase shift states to transmitted light in accordance with an electrical signal. More specifically, when no voltage is applied to the π cell 30, if linearly polarized light that vibrates in the direction perpendicular to the plane of the drawing of FIG. 1 becomes incident on the π cell 30, the direction of the polarization of the incident light is rotated through 90° by the optical rotary power of the TN liquid crystal, and the incident light emerges from the cell 30 as linearly polarized light that vibrates in the direction parallel to the plane of the drawing of FIG. 1. On the other hand, when a predetermined voltage is applied to the π cell 30, incident linearly polarized light that vibrates in the direction perpendicular to the plane of the drawing of FIG. 1 emerges from the cell 30 without being shifted in phase. That is, the π cell 30 is an optical element for n-shifting the phase between p- and s-polarized light beams.

A parallax image source 15 comprises, e.g., a multi-channel VCR, a multi-channel image pickup device having multi-channel cameras, three-dimensional data of an object, or the like. The plurality of images and three-dimensional data will be referred to as parallax image information hereinafter. Note that the multi-channel VCR, the multi-channel image pickup device, or the like has a plurality of images, and right and left parallax images (images with a parallax) are selected from these images.

An image processing means 3 extracts two parallax images $R_S$ (right parallax image) and $L_S$ (left parallax image) from the parallax image information of the parallax image source 15, divides each of these right and left parallax images $R_S$ and $L_S$ into vertically elongated stripe-shaped stripe pixels, synthesizes a single stripe image by alternately arranging these stripe pixels, and displays the stripe image on the display 1 via a display drive circuit 4. In the following description, Ri (i=1, 2, 3 . . . ) represents stripe pixels based on the parallax image $R_S$, and Li (i=1, 2, 3 . . . ) represents stripe pixels based on the parallax image $L_S$.

The display drive circuit 4 receives stripe image information from the image processing means 3, and displays it on the display screen of the display 1. A π cell drive circuit (a drive means for the phase shift member) 31 turns on/off the voltage to be applied to the π cell 30 in accordance with a signal from the image processing means 3. $E_R$ and $E_L$ respectively represent the right and left eyes of the observer.

The relationship between the stripe image 11 and the polarization optical element 2 of this embodiment will be described below. Let O be the interval (base length) between the two eyes of the observer, C be the observation distance from the image (stripe image) displayed on the image display screen, D be the interval between the display 1 and the polarization optical element 2, B' be the width, in the horizonal direction, of each of the polarization plates 2-A and 2-B constituting the polarization optical element 2, and p be the pixel interval (width) of stripe pixels constituting the stripe image displayed on the display 1. In order to attain stereoscopic viewing, these parameters must satisfy the following relations:

$$D = p \cdot C/(O+p) \tag{1}$$

$$B' = p \cdot (C-D)/C \tag{2}$$

Note that the observation width has a finite divergence at the observation position in practice, and these quantities are set after they are slightly modified. These relationships have been described in detail in the above-mentioned S. H. Kaplan's reference.

In this embodiment, since the display 1 uses a liquid crystal display having a pixel size of 0.110 mm (horizontal) ×0.330 mm (vertical), and one pixel size is set to be the width of one stripe pixel of each parallax image, the pixel interval is P=0.110 mm. On the other hand, since the base length and the observation distance are respectively set to be O=65 mm and C=1,000 mm as the observation conditions, the specifications of the polarization optical element 2 are D=1.69 mm and B'=0.1098 mm. Note that slight fine adjustment is made in consideration of the divergence of the observation width.

The stereoscopic image display method of this embodiment will be described below with reference to FIG. 1, FIGS. 2A and 2B, and FIGS. 3A and 3B. The image processing means 3 extracts two parallax images $R_S$ and $L_S$ from the parallax image source 15, divides these images into stripe pixels, and synthesizes a single stripe image 11' by alternately arranging these stripe pixels in the order of, e.g., R1, L2, R3, L4, R5, L6, . . . The image processing means 3 synthesizes another stripe image 11" by alternately arranging the remaining stripe pixels in the order of L1, R2, L3, R4, L5, R6, . . .

That is, the image processing means 3 synthesizes the stripe image 11' by alternately arranging odd order ones of stripe pixels Ri obtained by dividing the right parallax image $R_S$ and even order ones of stripe pixels Li obtained by dividing the left parallax image $L_S$ or synthesizes the stripe image 11" by alternately arranging even order ones of stripe pixels Ri obtained by dividing the right parallax image $R_S$ and odd order ones of stripe pixels Li obtained by dividing the left parallax image $L_S$.

At a certain time, the image processing means 3 synthesizes, e.g., a stripe image 11', outputs the image data to the display drive circuit 4, and displays the stripe image 11' on the display 1 (FIG. 2A).

At the same time, the image processing means 3 also supplies a timing signal to the π cell drive circuit 31 in synchronism with the above-mentioned output operation of the stripe image data, and the n cell drive circuit 31 turns on/off the voltage to be applied to the π cell 30 on the basis of the input timing signal.

For example, when the stripe image 11' is displayed on the display 1, a voltage is not applied to the π cell 30 (OFF). At this time, light which is emitted by the display 1 and reaches the polarization optical element 2 via the π cell 30 is linearly polarized light that vibrates in the direction parallel to the plane of the drawing in FIG. 1. This linearly polarized light is transmitted through the portions of the polarization plates 2-B of the polarization optical element 2, and arrives at the right and left eyes $E_R$ and $E_L$ of the observer (FIG. 2A).

Subsequently, the image processing means 3 synthesizes a stripe image 11", outputs the image data to the display drive circuit 4, and displays the stripe image 11" on the display 1. At the same time, the image processing means 3 applies a voltage to the π cell 30 (ON). At this time, light which is emitted by the display 1 and reaches the polarization optical element 2 via the π cell 30 is linearly polarized light that vibrates in the direction perpendicular to the plane of the drawing in FIG. 1. This linearly polarized light is transmitted through only the portions of the polarization plates 2-A of the polarization optical element 2 and arrives at the right and left eyes $E_R$ and $E_L$ of the observer (FIG. 2B).

Therefore, in the OFF state in which no voltage is applied to the π cell 30, the polarization optical element 3 forms a parallax barrier in which the polarization plates 2-A correspond to light-shielding portions, and the polarization plates 2-B correspond to aperture portions. In the ON state in which a voltage is applied to the π cell 30, the polarization optical element 3 forms a parallax barrier in which the polarization plates 2-B correspond to light-shielding portions, and the polarization plates 2-A correspond to aperture portions.

Figure 3A:
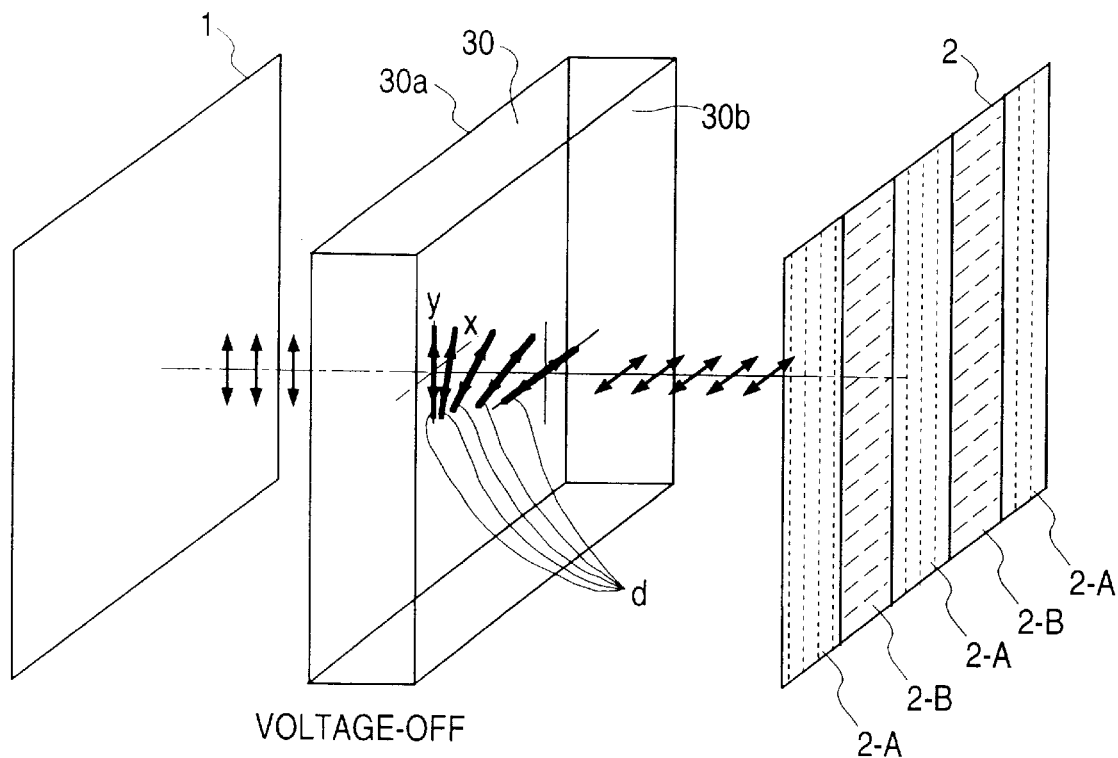
FIGS. 3A and 3B are explanatory views of the operation of a phase shift member in the first embodiment.
Figure 3B:
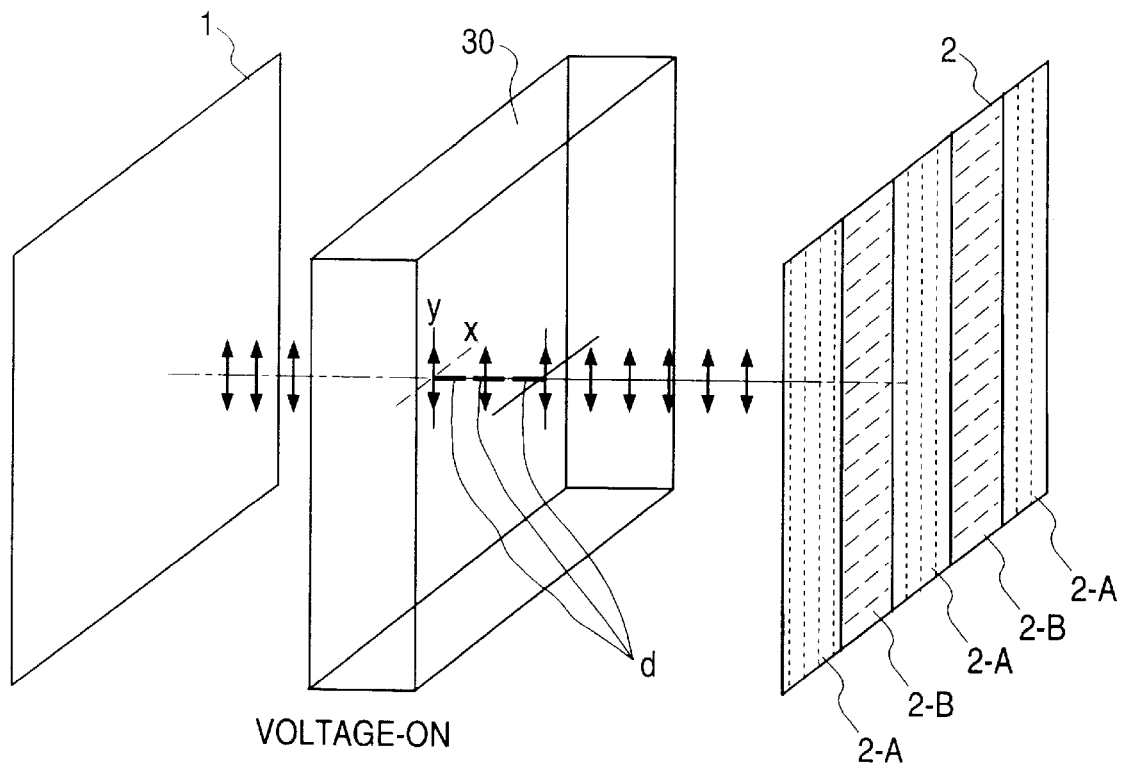

FIGS. 3A and 3B are explanatory views of the operation of the phase shift member (π cell) 30 of the first embodiment. FIG. 3A is an explanatory view in the OFF state in which no voltage is applied to the π cell 30, and FIG. 3B is an explanatory view in the ON state in which a voltage is applied to the π cell 30. Each of FIGS. 3A and 3B is a perspective view showing changes in direction of directors of the liquid crystal in the π cell 30 and changes in direction of polarization of light from the display 1 to the polarization optical element 2.

When the voltage to be applied to the π cell 30 is OFF (FIG. 3A), directors d of the liquid crystal in the π cell 30 rotate through 90° from an interface 30a on the display 1 side of the r cell 30 toward an interface 30b on the polarization optical element 2 side, and the direction of polarization of linearly polarized light, which is emitted by the display 1 and has a plane of vibration in the vertical direction (y-direction), changes along the directions of the directors d when the light is transmitted through the π cell 30. Then, the linearly polarized light emerges from the π cell 30 as linearly polarized light that vibrates in the horizontal direction (x-direction). This light is transmitted through the polarization plates 2-B constituting the polarization optical element 2, and is shielded by the polarization plates 2-A.

When the voltage to be applied to the π cell 30 is ON (FIG. 3B), the directors d of the liquid crystal in the π cell 30 align themselves in a direction (z-direction) substantially perpendicular to the interface of the π cell 30, and linearly polarized light, which is emitted by the display 1 and has a plane of vibration in the vertical direction, emerges from the π cell 30 without changing its direction of polarization. This light is transmitted through the polarization plates 2-A constituting the polarization optical element 2, and is shielded by the polarization plates 2-B.

In this embodiment, since the synthesized two stripe images 11' and 11" to be displayed on the display 1 are switched in synchronism with the ON/OFF state of the voltage to be applied to the π cell 30, the switching operation of the parallax barrier function of the polarization optical element 2 is performed in synchronism with the switching operation of the stripe image 11 to be displayed on the display 11, thus alternately, repetitively realizing the display states of two stereoscopic images. That is, the states shown in FIGS. 2A and 2B are time-divisionally and alternately realized, so that the observer can recognize a stereoscopic image. The frame rate of this switching operation is preferably set to be a predetermined frequency, e.g., 60 Hz or higher, which does not cause any flicker on an image.

That is, at a given instance (in the display state shown in FIG. 2A), the display 1 displays the stripe image 1 obtained by arranging stripe pixels in the order of R1, L2, R3, L4, R5, L6, . . . , and the polarization optical element 2 serves as a parallax barrier 2', on which light-shielding portions and aperture portions are formed in the order of close, open, close, open, . . . , by turning off the voltage to be applied to the π cell 30. At this time, only a right-eye image constituted by stripe pixels R1, R3, R5, . . . is incident on the right eye $E_R$ of the observer, and only a left-eye image constituted by stripe pixels L2, L4, L6, . . . is incident on the left eye $E_L$, so that the observer can attain stereoscopic viewing.

At the next instance (in the display state shown in FIG. 2B), the display 1 displays the stripe image 11' obtained by arranging stripe pixels in the order of L1, R2, L3, R4, L5, R6, . . . , and the polarization optical element 2 serves as a parallax barrier 2", on which light-shielding portions and aperture portions are formed in the order of open, close, open, close, . . . , by turning on the voltage to be applied to the π cell 30. At this time, only a right-eye image constituted by stripe pixels $R_2$, $R_4$, $R_6$, . . . is incident on the right eye $E_R$ of the observer, and only a left-eye image constituted by stripe pixels L1, L3, L5, . . . is incident on the left eye $E_L$, so that the observer can similarly attain stereoscopic viewing.

Since these two display states are alternately displayed at a frame rate of 60 Hz or higher, the right eye can observe stripe pixels R1, R2, R3, R4, R5, . . . , the left eye can observe stripe pixels L1, L2, L3, L4, L5, . . . , and the observer can recognize the parallax images $R_S$ and $L_S$ without any omission. That is, the observer can observe a high-quality stereoscopic image without the resolution of the display 1 being lowered.

Since the resolution lowers to ½ that of the display to be used in the stereoscopic image display apparatus using the conventional parallax barrier method, an image displayed in this embodiment can have a resolution twice that of the image obtained by the stereoscopic image display apparatus using the conventional parallax barrier method.

Furthermore, in this embodiment, since the aperture portions and the light-shielding portions of the parallax barrier can be alternately switched at high speed, the contrast of a moiré pattern which tends to be generated in the parallax barrier method lowers, and from this viewpoint as well, the quality of a stereoscopic image can be improved.

In this embodiment, the width of one pixel of the display 1 is equal to the interval P of the stripe image 11, i.e., each of the stripe pixels R1, L2, . . . corresponds to the width of one pixel of the display 1. Alternatively, one stripe pixel may be displayed using a plurality of pixels of the display 1, and for example, R, G, and B pixels upon execution of a color display operation may be formed.

In this embodiment, the two parallax images $R_S$ and $L_S$ are displayed. Also, the same method can be applied to a "parallax panoramagram" in which a stripe image is generated by synthesizing a plurality of parallax images, and is observed via an appropriate parallax barrier.

The display 1 used in this embodiment is required to have a high frame rate of 60 Hz or higher. Since a ferroelectric liquid crystal display (FLC) has a very high display speed, it is suitably used as the display 1 of this embodiment.

In this embodiment, the entire screen of the display 1 is used for displaying a stereoscopic image, as described above. Also, a two-dimensional image (non-stereoscopic image) or images including both a stereoscopic image and a two-dimensional image can be displayed on the display 1. The methods of displaying a two-dimensional image or images including both a stereoscopic image and a two-dimensional image will be explained below.

When a two-dimensional image is to be displayed on the display 1, the image processing means 3 does not generate any stripe image, and directly supplies, to the display drive circuit 4, two-dimensional image information sent from a two-dimensional image source (not shown) to the image processing means 3. The display drive circuit 4 displays the two-dimensional image on the display 1. On the other hand, the π cell drive circuit 31 turns on/off the voltage to be applied to the π cell 30 at predetermined intervals. When the voltage to be applied to the π cell 30 is ON or OFF, the polarization optical element 2 serves as a parallax barrier having the polarization plates 2-B or 2-A as aperture portions, as described above.

When a two-dimensional image is displayed, the image displayed on the display 1 is not a stripe image, and the right and left eyes of the observer respectively observe images in which half pixels of the two-dimensional image cannot be seen in each of the ON and OFF states of the voltage to be applied to the π cell 30. However, since the ON and OFF states of the voltage to be applied to the π cell 30 are switched time-divisionally, pixels which cannot be seen are compensated for, and the observer can recognize an image consisting of all the pixels of the display 1. The ON and OFF timings of the voltage to be applied to the π cell 30 can be generated based on the frame signal of a two-dimensional image.

If it is admissible that half pixels of the display 1 not be seen, the observer can recognize a two-dimensional image displayed on the display 1 without time-divisionally driving the π cell 30.

Figure 4A:
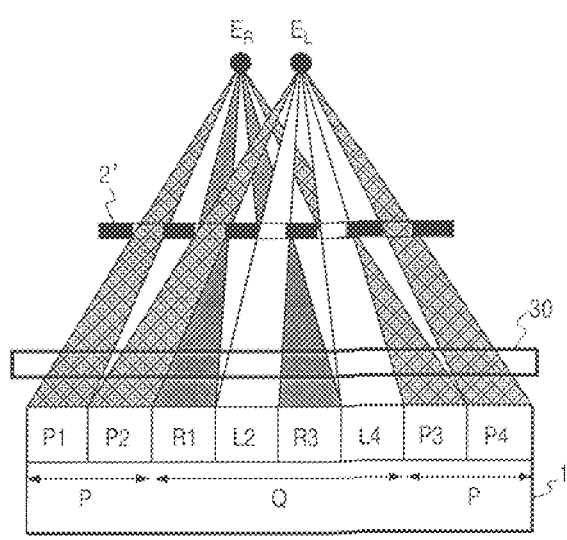
FIGS. 4A and 4B are explanatory views of the display state of images including both a stereoscopic image and a two-dimensional image in the first embodiment.
Figure 4B:
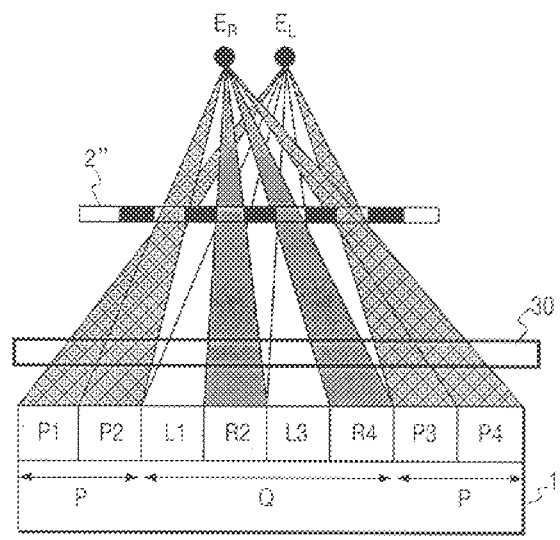

FIGS. 4A and 4B are explanatory views of the display state of images including both a stereoscopic image and a two-dimensional image in the first embodiment. In FIGS. 4A and 4B, regions P in the display screen of the display 1 are two-dimensional image display regions, and display portions Pi of a two-dimensional image to be displayed on the display 1. A region Q is a stereoscopic image display region, and displays a portion of a stripe image obtained by synthesizing parallax images $R_S$ and $L_S$.

As described above, the two stripe images to be displayed on the region Q are switched in synchronism with the ON/OFF states of the voltage to be applied to the π cell 30, thus displaying a stereoscopic image. The regions P display a two-dimensional image. Upon switching the voltage to be applied to the π cell 30 between the ON and OFF states, the parallax barrier function of the polarization optical element 2 is switched. In this case, as in the above-mentioned case wherein a two-dimensional image is displayed using this embodiment, a two-dimensional image displayed on all the pixels in the regions P can be displayed for the observer.

The above-mentioned stereoscopic image display region and the two-dimensional image display regions are obtained by dividing the display screen in the horizontal direction. However, the stereoscopic image display region and the two-dimensional image display regions can be obtained by arbitrarily dividing the image display screen.

Figure 5:
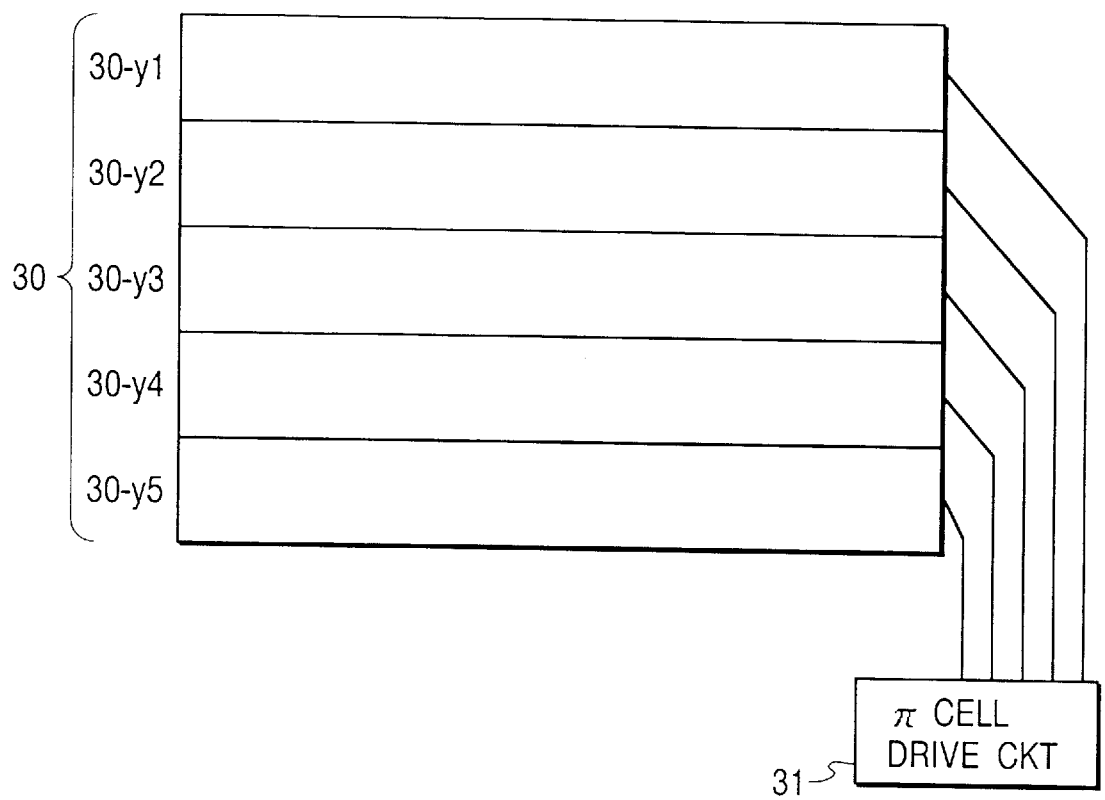
FIG. 5 is an explanatory view showing the principal part of a π cell in a stereoscopic image display apparatus according to the second embodiment of the present invention.
Figure 6:
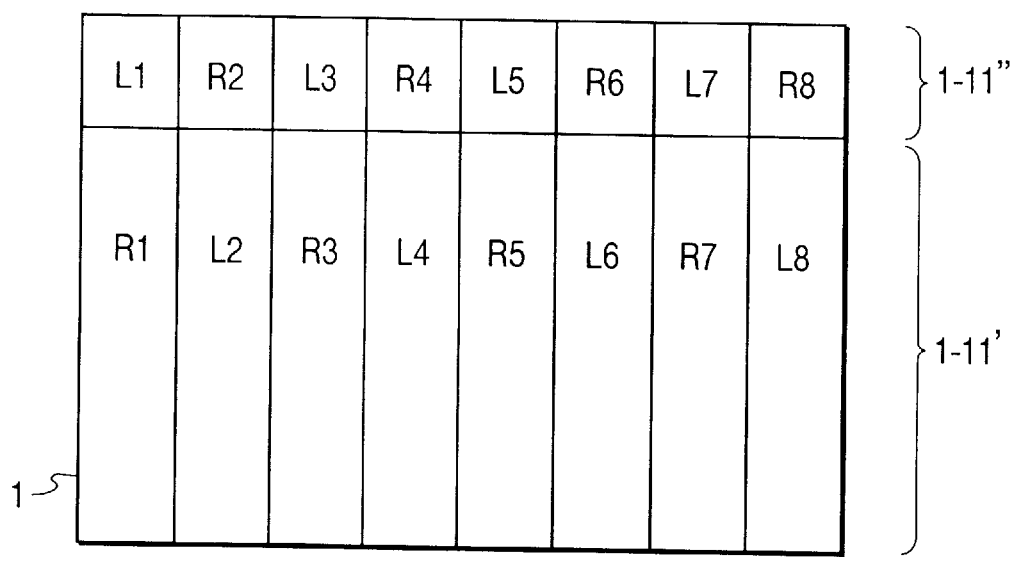
FIG. 6 is an explanatory view of an image during switching from a stripe image 11' to a stripe image 11" in the first and second embodiments.

FIG. 5 is a schematic diagram showing principal part of a π cell in a stereoscopic image display apparatus according to the second embodiment of the present invention. FIG. 5 illustrates a π cell 30 in a front view. The only difference between this embodiment and the first embodiment resides in the portion of the π cell, and other portions are the same as those in the first embodiment. In the first embodiment, when the display 1 comprises a normal scan line type display, the switching operation of the stripe image 11' to the stripe image 11" to be displayed on the display 1 is performed from the upper portion toward the lower portion of the screen along the horizontal scan lines. FIG. 6 is an explanatory view showing the state during the switching operation from the stripe image 11' to the stripe image 11", which are obtained by synthesizing the two parallax images $R_S$ and $L_S$. The switching operation to the stripe image 11" has been completed on a screen region 1-11" of the display 1, and the switching operation to the stripe image 11" has not been performed yet on a screen region 1-11' of the display 1. This region 1-11' still displays the stripe image 11'.

In the first embodiment, only after the switching operation to the stripe image 11" has been completed, the drive state of the π cell 30 is switched. For this reason, in the state during the switching operation to the stripe image 11", the stripe image and the parallax barrier to be formed on the polarization optical element 2 do not have a correct relationship therebetween on either the screen regions 1-11' or 1-11", and a stereoscopic image cannot be normally observed. This embodiment can eliminate this problem.

Unlike in the first embodiment, the π cell 30 of this embodiment is divided into a predetermined number of portions in the vertical direction of the screen, and these portions are independently driven, as shown in FIG. 5. The effective region of the π cell 30 is vertically divided into five horizontally elongated regions 30-y1, 30-y2, 30-y3, 30-y4, and 30-y5, which can be independently driven.

In this embodiment, the voltages to be applied to the regions 30-y1, 30-y2, 30-y3, 30-y4, and 30-y5 of the π cell are turned on/off, so that the polarization optical element 2 can normally serve as a parallax barrier for stripe images displayed on regions of the display 1 corresponding to the regions 30-y1, 30-y2, 30-y3, 30-y4, and 30-y5 of the π cell 30.

FIGS. 7A to 7C and FIGS. 8A to 8C are explanatory views of the operations of the display 1, the π cell 30, and the polarization optical element 2. The ON/OFF control of the voltages to the applied to the respective regions of the π cell 30 and the control effect will be described below with reference to FIGS. 7A to 7C and FIGS. 8A to 8C. FIGS. 8A to 8C and FIGS. 7A to 7C are exploded views of the display 1, the π cell 30, and the polarization optical element 2. The display 1 and the polarization optical element 2 respectively have regions 1-y1, 1-y2, 1-y3, 1-y4, and 1-y5, and regions 2-y1, 2-y2, 2-y3, 2-y4, and 2-y5 in correspondence with the regions 30-y1, 30-y2, 30-y3, 30-y4, and 30-y5 of the π cell 30.

Figures 7A, 7B, 7C:
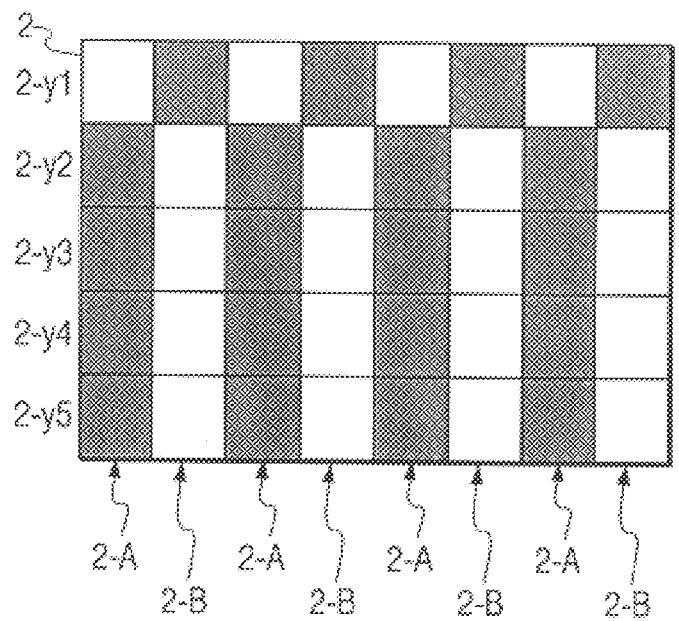
FIGS. 7A to 7C are explanatory views of the operation of a display 1, a phase shift member 30, and a polarization optical element 2 in the second embodiment.

FIGS. 7A to 7C show the states of the respective elements at time t=t1. The display 1 is in the middle of a switching operation from the stripe image 11' to the stripe image 11". In this state, an image on the region 1-y1 of the display 1 has been switched to the stripe image 11", and other regions display the stripe image 11'.

Figures 8A, 8B, 8C:
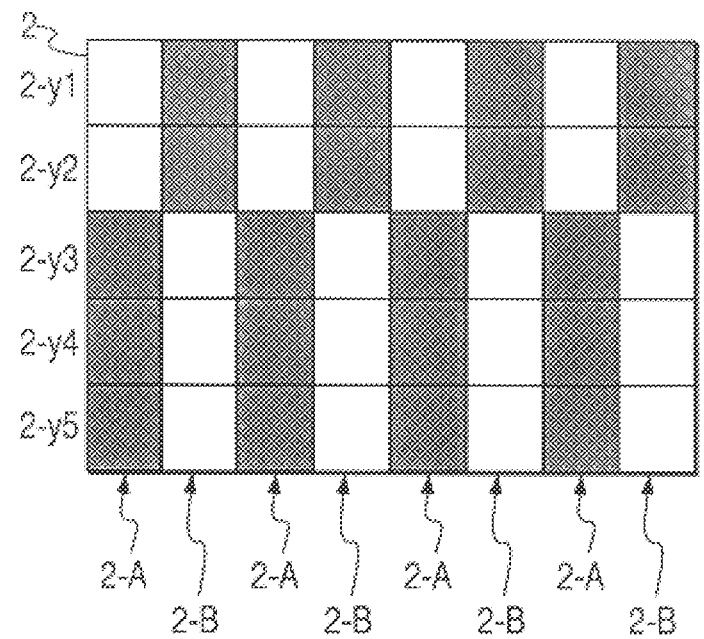
FIGS. 8A to 8C are explanatory views of the operation of the display 1, the phase shift member 30, and the polarization optical element 2 in the second embodiment.

FIGS. 8A to 8C the states of the respective elements at time t=t2 a predetermined period of time after time t1. Images on the regions 1-y1 and 1-y2 of the display 1 have been switched to the stripe image 11", and other regions display the stripe image 11'.

At time t=t1, the voltage to be applied to the region 30-y1 of the π cell 30 is ON, and the voltages to be applied to other regions are OFF. With these voltages, the polarization optical element 2 forms a parallax barrier, in which the polarization plates 2-A serve as aperture portions and the polarization plates 2-B serve as light-shielding portions, on the region 2-y1, and forms parallax barriers, in which the polarization plates 2-B serve as aperture portions and the polarization plates 2-A serve as light-shielding portions, on other regions.

At time t=t2, the voltages to be applied to the regions 30-y1 and 30-y2 of the π cell 30 are ON, and the voltages to be applied to other regions are OFF. The polarization optical element 2 forms a parallax barrier, in which the polarization plates 2-A serve as aperture portions and the polarization plates 2-B serve as light-shielding portions, on the regions 2-y1 and 2-y2, and forms parallax barriers, in which the polarization plates 2-B serve as aperture portions and the polarization plates 2-A serve as light-shielding portions, on other regions.

The ON/OFF signals to the respective regions of the π cell 30 can be generated as synchronization signals from the horizontal synchronization signal of an image signal to be displayed in correspondence with the number of divided regions.

As described above, since the ON/OFF states of the voltages to be applied to the respective regions of the π cell 30 are switched as the stripe images are being switched from the upper portion toward the lower portion of the screen, parallax barriers corresponding to the stripe images of the respective regions are formed on the polarization optical element 2, thus displaying a higher-quality stereoscopic image which suffers less crosstalk between the right and left parallax images as compared to the first embodiment.

In this embodiment, a two-dimensional image and images including both a two-dimensional image and a stereoscopic image can be displayed by the same method as in the first embodiment.

In this embodiment, the number of divided regions of the π cell 30 is 5. However, the present invention is not limited to this. Ideally, divided regions corresponding in number to the horizontal scan lines of the display 1 are required. Even when the number of divided region is smaller than the ideal number of regions, the image quality can be improved as compared to a conventional stereoscopic image display apparatus using a non-divided π cell.

When the π cell comprises an FLC in place of the TN liquid crystal used in this embodiment, since the liquid crystal response time (switching time) per region is about 32 msec, the cell can be divided up to 520 regions if the drawing time per frame of the display 1 is assumed to be 1/60 sec.

Figure 9:
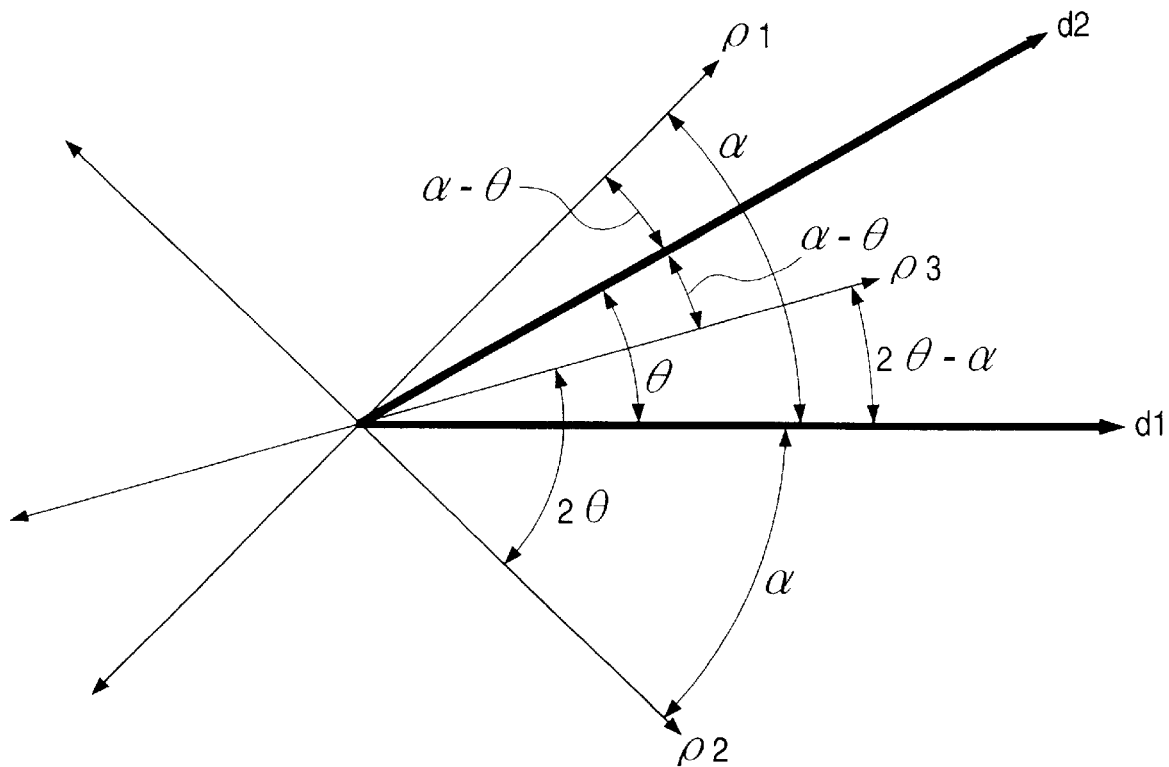
FIG. 9 is an explanatory view of the principle of constituting a phase shift member using an FLC.

FIG. 9 is an explanatory view of the principle when the π cell 30 comprises an FLC. As is well known, the FLC can have two stable states, d1 represents the director of the liquid crystal in the first stable state, and d2 represents the director of the liquid crystal in the second stable state. θ represents the angle formed between the two directors d1 and d2. The FLC has optical axes in the director direction and a direction perpendicular thereto.

In the FLC, the angle θ between the directors and the refractive index difference, Δn, between the directions of the two axes vary depending on its material. In a material that is currently available, the angle θ between the directors falls within the range from 20° to 50°, and the refractive index difference Δn is about 0.1. An example wherein the phase shift member 30 consists of a material with a refractive index difference Δn=0.1 will be explained below. When the center wavelength of incident light is 600 nm, if the liquid crystal layer has a thickness of 3 μm, a phase difference of exactly π is obtained. In FIG. 9, when linearly polarized light ρ1 whose direction of polarization is tilted through an angle α with respect to the director d1 is transmitted through this 3-μm thick liquid crystal layer, if the FLC is in the first state, i.e., it has the director d1, the linearly polarized light ρ1 is converted into linearly polarized light ρ2 whose direction of polarization agrees with a direction tilted through the angle α in the direction opposite to the director d1.

On the other hand, when the FLC is in the second state, i.e., it has the director d2, if the linearly polarized light ρ1 whose direction of polarization is tilted through an angle a with respect to the director d1 is transmitted through this liquid crystal layer, the linearly polarized light ρ1 is converted into linearly polarized light ρ3 whose direction of polarization agrees with a direction tilted through an angle α−θ with respect to the director d2. The tilt angle between the linearly polarized light ρ3 and the director d1 is:

$$\theta-(\alpha-\theta)=2\cdot\theta-60$$

The planes of polarization of the linearly polarized light ρ2 and the linearly polarized light ρ3 form an angle:

$$2\cdot\theta-\alpha+\alpha=2\theta$$

Therefore, the angle formed between the directions of polarization of the two linearly polarized light ρ2 and linearly polarized light ρ3 after transmission becomes twice that formed between the directors d1 and d2 independently of the direction of polarization of the incident linearly polarized light.

Figure 10:
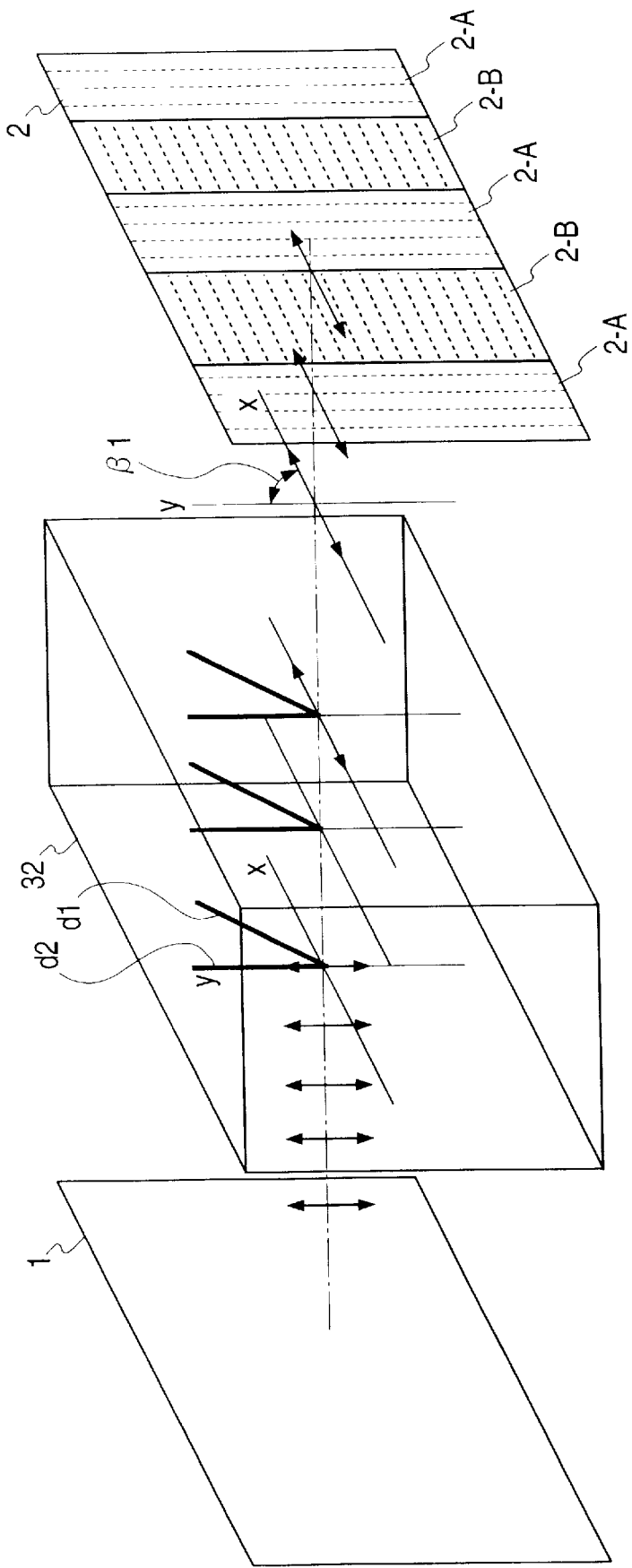
FIG. 10 is an explanatory view showing the operation when the phase shift member constituted by the FLC is used in the first and second embodiments.
Figure 11:
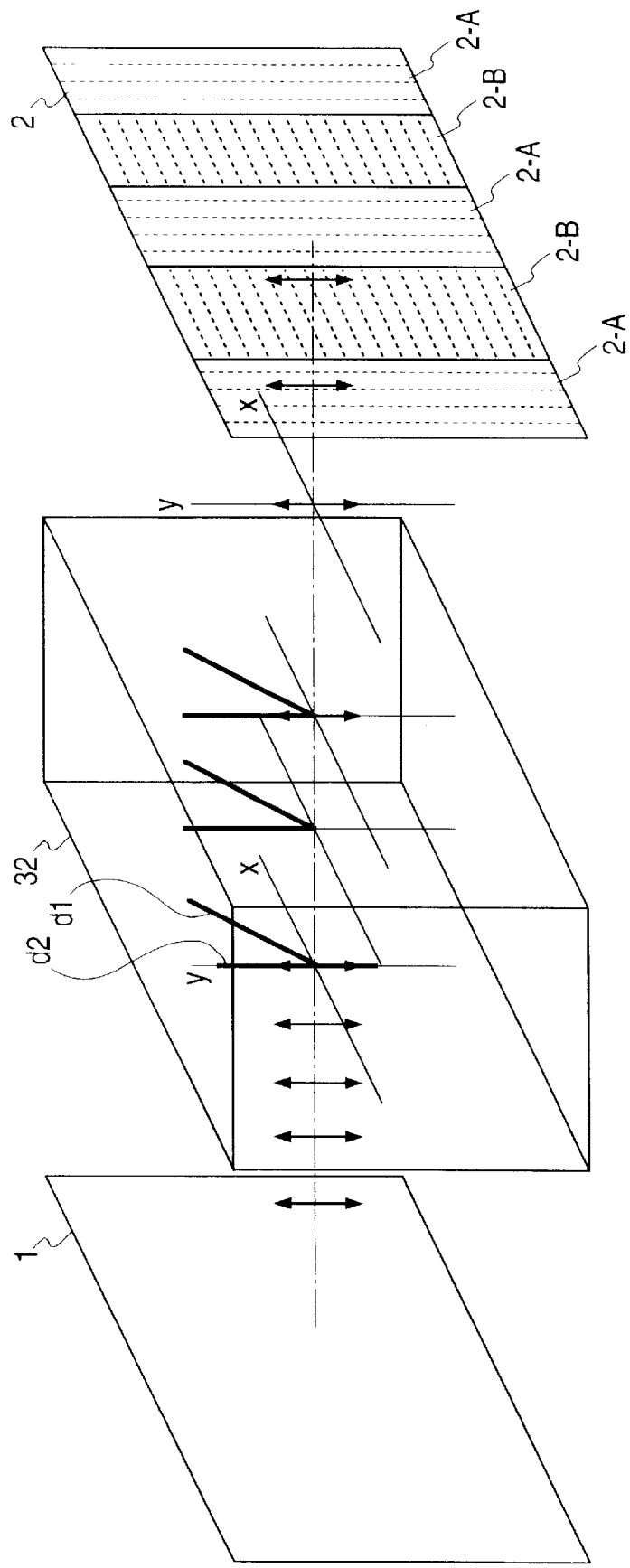
FIG. 11 is an explanatory view showing the operation when the phase shift member constituted by the FLC is used in the first and second embodiments.

FIGS. 10 and 11 show the arrangements used when a phase shift member 32 comprising an FLC with θ=45°, Δn=0.1, and a thickness of 3 μm is used in the first and second embodiments, and are perspective views for explaining a change in direction of polarization of linearly polarized light which is emitted by the display 1 and has a direction of vibration (parallel to the y-axis in FIGS. 10 and 11) agreeing with the vertical direction until the light reaches the polarization optical element 2 via the phase shift member 32. The direction of the director d1 is set in a direction tilted through 45° with respect to the y-axis, and the direction of the director d2 is set to be parallel to the y-axis in FIGS. 10 and 11. When the polarization optical element 2 forms a parallax barrier in which the polarization plates 2-A serve as light-shielding portions and the polarization plates 2-B serve as aperture portions, a predetermined voltage is applied to the FLC to have the director d1. FIG. 10 shows this state. In FIG. 10, light transmitted through the phase shift member 32 is converted into linearly polarized light having a direction of polarization agreeing with a direction tilted through β1=90° from the y-axis in FIG. 10, i.e., the direction parallel to the x-axis, and reaches the polarization optical element 2. When the polarization optical element 2 forms a parallax barrier in which the polarization plates 2-B serve as light-shielding portions and the polarization plates 2-A serve as aperture portions, a predetermined voltage is applied to the FLC to have the director d2. FIG. 11 shows this state. Light transmitted through the phase shift member 32 reaches the polarization optical element 2 as linearly polarized light having a direction of polarization agreeing with the direction parallel to the y-axis in FIG. 11. Note that the voltage for setting the director d2 has the same magnitude as but the opposite sign to that for setting the director d1.

Note that the liquid crystal layer of the FLC preferably has a thickness of 2 μm or less. For this purpose, when two 1.5-μm thick FLC layers which have the same directions of the two directors and the same refractive index difference Δn are stacked and are simultaneously subjected to the voltage control, they can serve as the above-mentioned phase shift member consisting of the 3-μm thick FLC layer.

Figure 12:
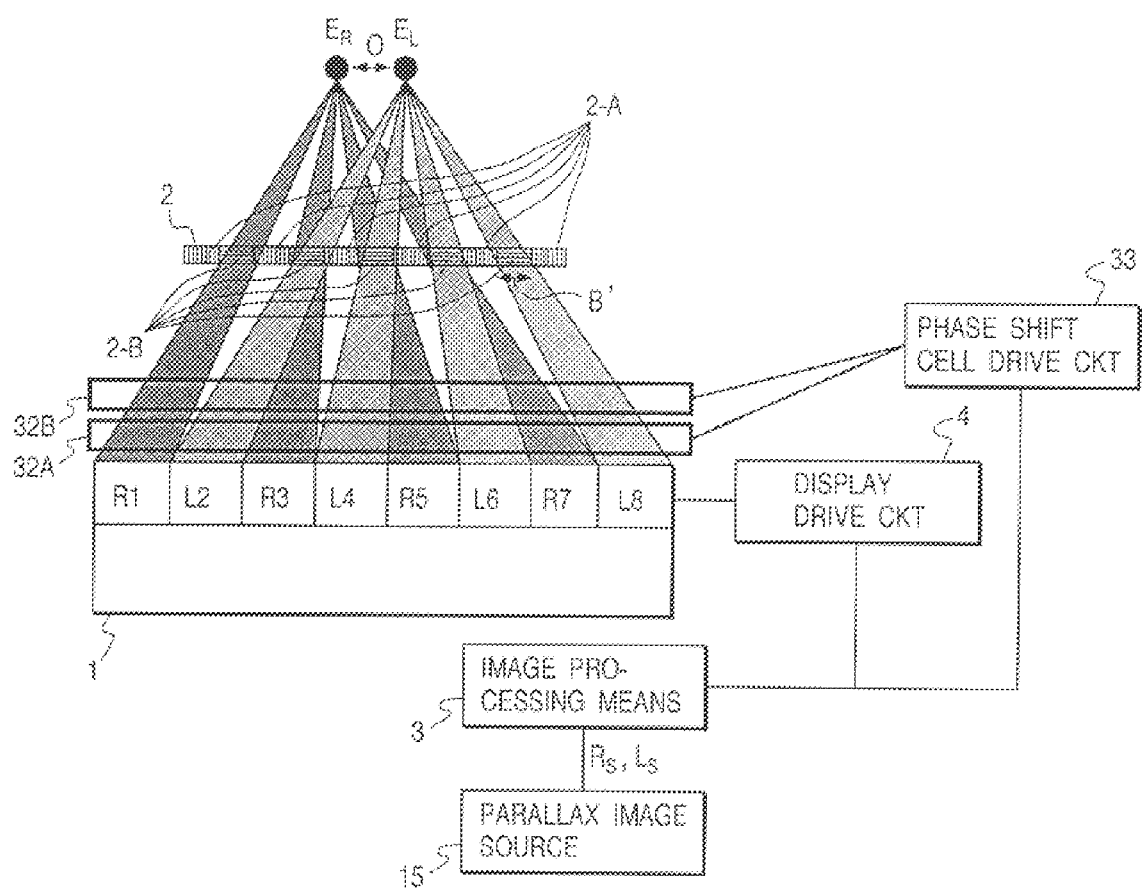
FIG. 12 is a schematic diagram showing principal part of a stereoscopic image display apparatus according to the third embodiment of the present invention.

FIG. 12 is a schematic diagram showing principal part of a stereoscopic image display apparatus according to the third embodiment of the present invention. Unlike in the first embodiment, a phase shift member is constituted by two phase shift elements in this embodiment, and other arrangements are the same as those in the first embodiment. The same reference numerals in FIG. 12 denote the same parts as in the first embodiment. In this embodiment, differences from the first embodiment will be mainly described.

In FIG. 12, a first phase shift element 32A consists of a TN liquid crystal. When no voltage is applied to the first phase shift element 32A and linearly polarized light that vibrates in a direction perpendicular to the plane of the drawing in FIG. 12 becomes incident on the first phase shift element 32A, the first phase shift element 32A outputs linearly polarized light, the vibration direction of which is tilted through 45° with respect to that of the incident light, by the optical rotary power of the TN liquid crystal. When a predetermined voltage is applied to the first phase shift element 32A, the element 32A outputs incident linearly polarized light that vibrates in the direction perpendicular to the plane of the drawing of FIG. 12 without changing its phase. A second phase shift element 32B consists of a TN liquid crystal. When no voltage is applied to the second phase shift element 32B and linearly polarized light that vibrates in a direction tilted through 45° with respect to the direction perpendicular to the plane of the drawing in FIG. 12 becomes incident on the second phase shift element 32B, the second phase shift element 32B outputs linearly polarized light, the vibration direction of which agrees with the direction parallel to the plane of the drawing of FIG. 12, by the optical rotary power of the TN liquid crystal. When a predetermined voltage is applied to the second phase shift element 32B, the element 32B outputs incident linearly polarized light that vibrates in a direction tilted through 45° with respect to the direction perpendicular to the plane of the drawing in FIG. 12 without changing its phase.

Figure 13:
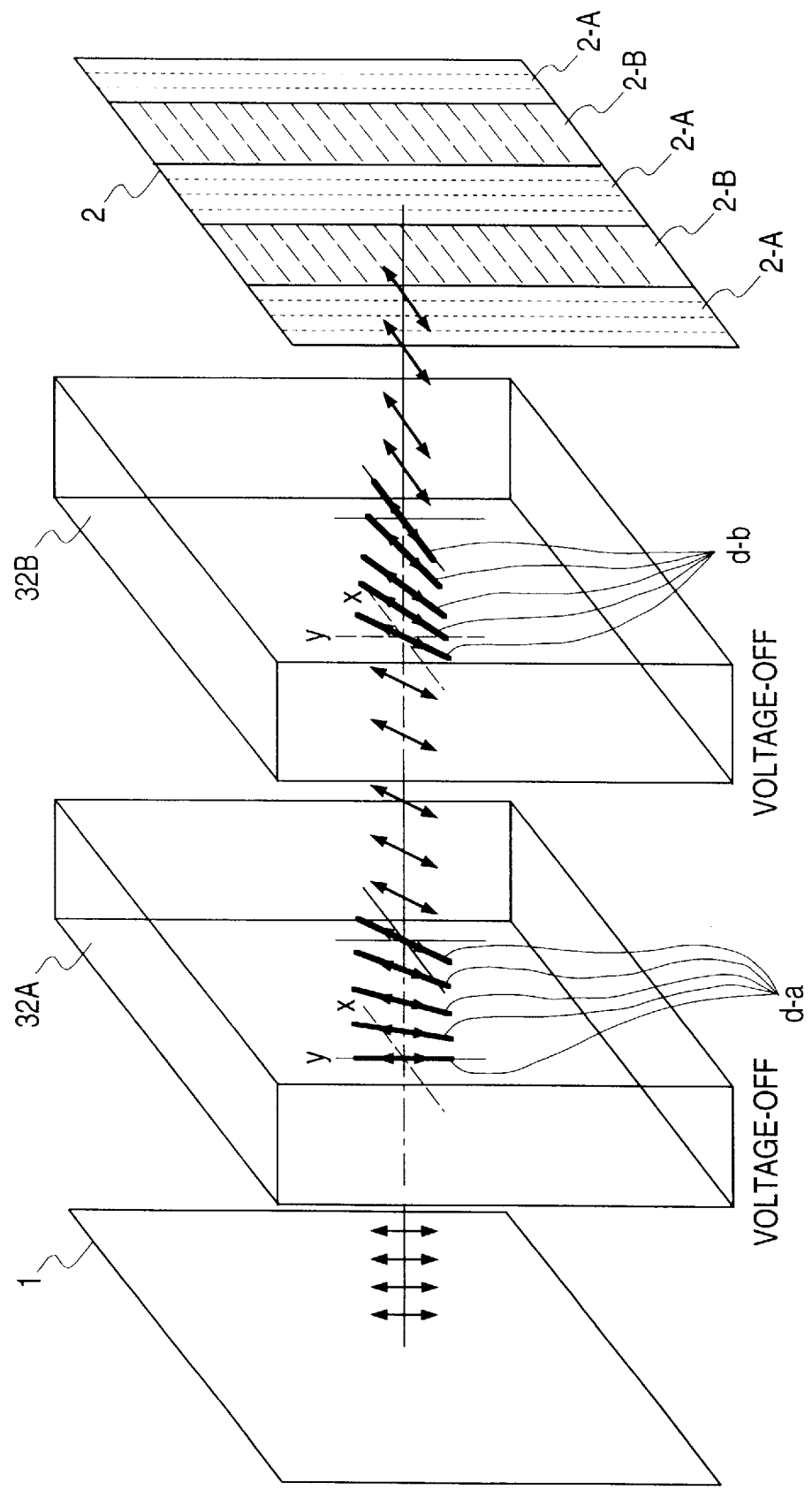
FIG. 13 is an explanatory view of the operation for displaying a stereoscopic image in the third embodiment.

The stereoscopic image display method of this embodiment will be described below. FIG. 13 is an explanatory view of the operation for displaying a stereoscopic image in the third embodiment. FIG. 13 shows the directions of directors of the phase shift elements of the third embodiment, and a change in polarization state of light. In order to display a stereoscopic image in the third embodiment, the voltages to be applied to the first and second phase shift elements 32A and 32B are simultaneously turned on/off. FIG. 13 is an explanatory view when the voltages to be applied to the elements are simultaneously turned off.

When the voltages to be applied to the first and second phase shift elements 32A and 32B are OFF, a director d-a of the liquid crystal in the first phase shift element 32A is set in the vertical direction (y-direction) at the interface on the display 1 side, and rotates through 45° toward the interface on the second phase shift element 32B side. The direction of polarization of linearly polarized light having a plane of vibration in the vertical direction (y-direction) changes along the direction of the director d-a when the light is transmitted through the first phase shift element 32A, and linearly polarized light emerges from the first phase shift element 32A as linearly polarized light having a direction of vibration tilted through 45° with respect to the vertical direction.

A director d-b of the liquid crystal in the second phase shift element 32B is set to be tilted through 45° from the vertical direction at the interface on the first phase shift element 32A side, rotates through 45° toward the interface on the polarization optical element 2 side, and is set in the horizontal direction at the interface on the polarization optical element 2 side. Thus, the direction of polarization of the linearly polarized light which is transmitted through the first phase shift element 32A and has a direction of vibration tilted through 45° from the vertical direction changes along the direction of the director d-b when the light is transmitted through the second phase shift element 32B, and linearly polarized light emerges from the second phase shift element 32B as linearly polarized light having a direction of vibration agreeing with the horizontal direction. This light is shielded by the polarization plates 2-A and is transmitted through the polarization plates 2-B in the polarization optical element 2.

Although not shown, when the voltages to be applied to the first and second phase shift elements 32A and 32B are ON, the directors d-a and d-b are oriented in a direction (z-direction) substantially perpendicular to the respective interfaces, and incident linearly polarized light having a direction of vibration agreeing with the vertical direction is transmitted through the first and second phase shift elements 32A and 32B without changing its direction of polarization. This light is shielded by the polarization plates 2-B and is transmitted through the polarization plates 2-A in the polarization optical element 2.

As described above, when the voltages to be applied to the first and second phase shift elements 32A and 32B are simultaneously turned on/off, a combination of the first and second phase shift elements 32A and 32B can operate in the same manner as the π cell 30 in the first embodiment, and the apparatus of this embodiment operates in the same manner as in the first embodiment to display a stereoscopic image.

In this embodiment, in addition to the above-mentioned stereoscopic image display operation, a two-dimensional image and images including both a stereoscopic image and a two-dimensional image can be displayed by the same method as in the first embodiment. Furthermore, in this embodiment, a two-dimensional image can also be displayed by a method different from that of the first embodiment.

This method of displaying a two-dimensional image will be described below. When image information supplied from an image source (not shown) to the image processing means 3 is two-dimensional image information, the image processing means 3 directly supplies the two-dimensional image to the display drive circuit 4 without generating any stripe image, and the display drive circuit 4 displays the two-dimensional image on the display 1. At the same time, the image processing means 3 supplies a signal indicating that an image to be displayed is a two-dimensional image to a phase shift cell drive circuit (a driving means of a phase shift member) 33. Upon reception of this signal, the phase shift cell drive circuit 33 does not apply any voltage to the first phase shift element 32A, but continuously applies a voltage to only the second phase shift element 32B.

FIG. 14 is an explanatory view of the operation for displaying a two-dimensional image in the third embodiment. In order to display a two-dimensional image in the third embodiment, no voltage is applied to the first phase shift element 32A, but a predetermined voltage is continuously applied to only the second phase shift element 32B.

Referring to FIG. 14, the director d-a of the liquid crystal in the first phase shift element 32A is set in the vertical direction (y-direction) at the interface on the display 1 side, and rotates through 45° toward the interface on the second phase shift element 32B side. The direction of polarization of linearly polarized light which is emitted by the display 1 and has a plane of vibration in the vertical direction changes along the direction of the director d-a when the light is transmitted through the first phase shift element 32A, and the linearly polarized light emerges from the first phase shift element 32A as linearly polarized light having a plane of vibration in a direction tilted through 45° from the vertical direction. The director d-b of the liquid crystal in the second phase shift element 32B is oriented in a direction (z-direction) substantially perpendicular to the respective interfaces, and does not rotate the direction of polarization of linearly polarized light transmitted through the element 32B. Thus, the linearly polarized light which becomes incident on the second phase shift element 32B and has a plane of vibration in the direction tilted through 45° from the vertical direction emerges from the second phase shift element 32B without being changed in its plane of vibration, and becomes incident on the polarization optical element 2. Since the two different types of polarization plates 2-A and 2-B which constitute the polarization optical element 2 show equal transmittance with respect to the linearly polarized light having a direction of vibration tilted through 45° from the direction perpendicular to the plane of the drawing of FIG. 14, light which has two-dimensional image information and is input from the display 1 to the polarization optical element 2 via the first and second phase shift elements 32A and 32B can reach the observer at an equal intensity independently of the two different types of polarization plates 2-A and 2-B of the polarization optical element 2 through which the light is transmitted.

As described above, according to this embodiment, a two-dimensional image can be displayed by the novel method. With this method, since the polarization optical element 2 shields none of the pixels of the display 1, the observer can observe a high-resolution image. Since images and optical phases need not be switched time-divisionally, flicker can be prevented from being generated. In this embodiment as well, the first and second phase shift elements may consist of FLCs.

Figure 15A:
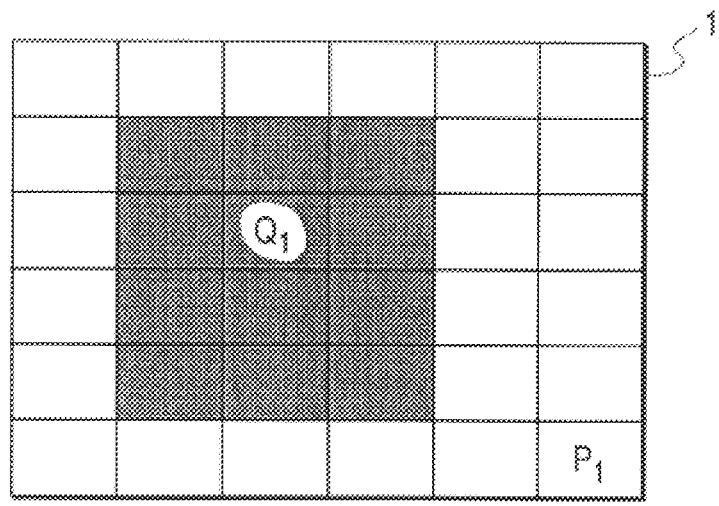
FIGS. 15A to 15C are partial explanatory views of a stereoscopic image display apparatus according to the fourth embodiment of the present invention.
Figure 15B:
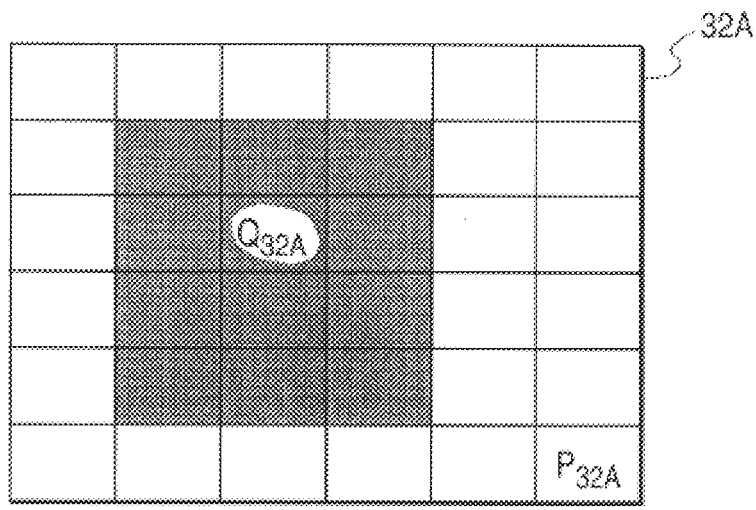
Figure 15C:
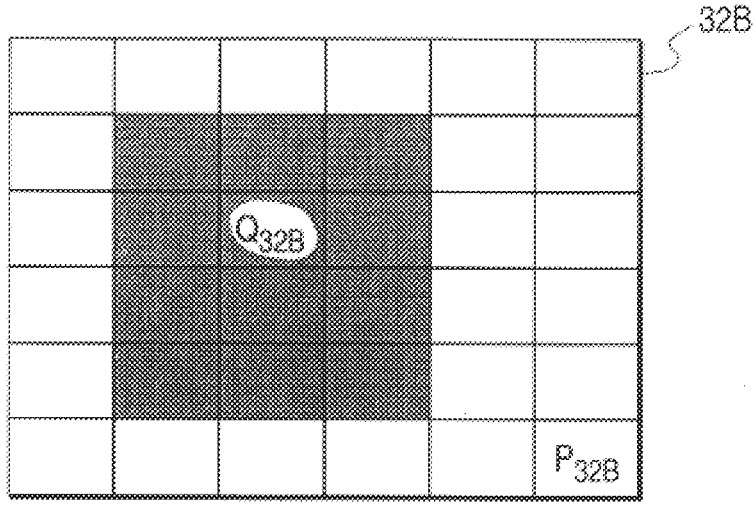
Figure 16:
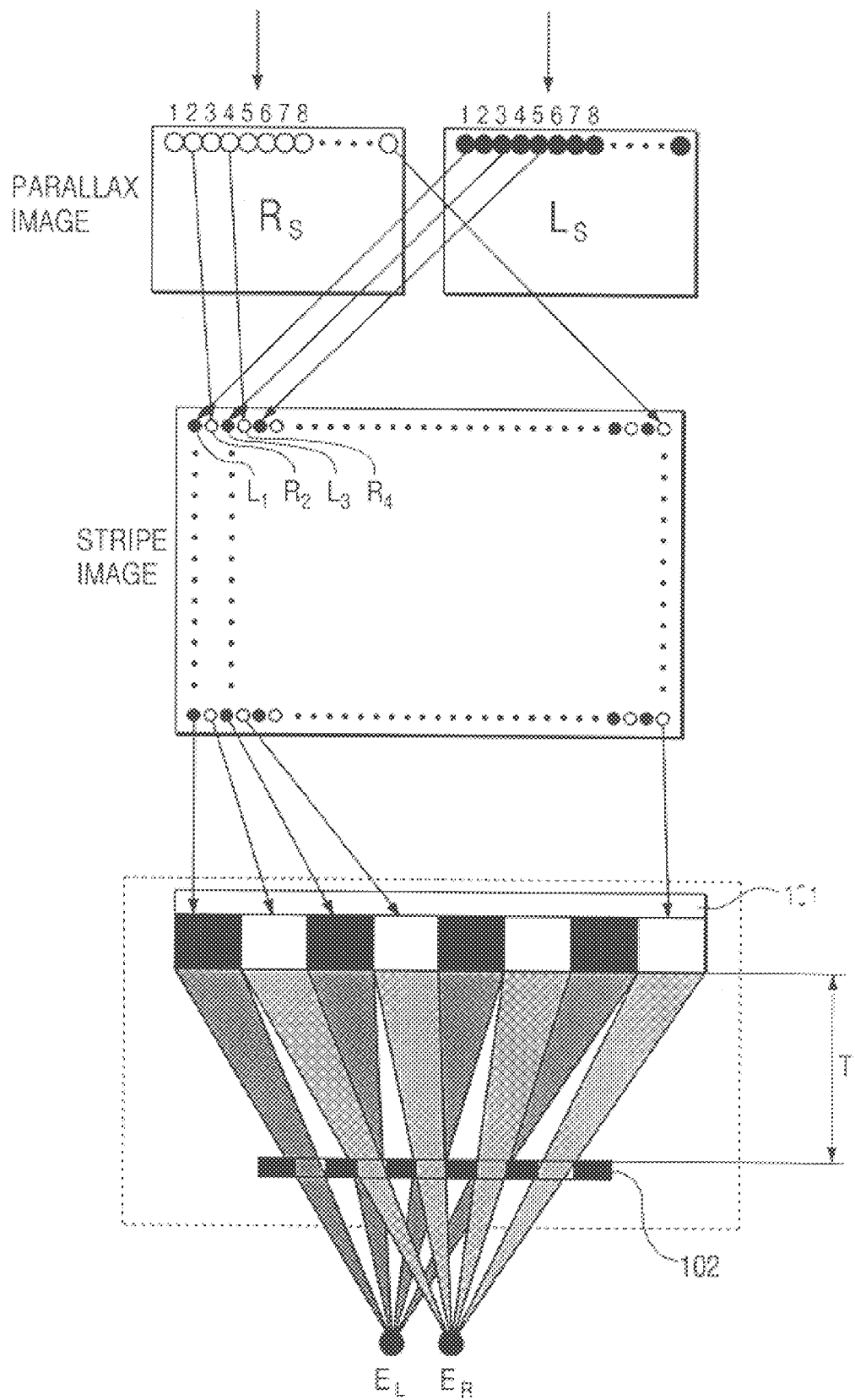
FIG. 16 is a schematic diagram showing principal part of a conventional stereoscopic image display apparatus based on a parallax barrier method.

FIGS. 15A to 15C are partial explanatory views of a stereoscopic image display apparatus according to the fourth embodiment of the present invention. Unlike in the third embodiment, each of the first and second phase shift elements 32A and 32B is divided into a plurality of regions which can be independently driven in this embodiment, and other arrangements are the same as those in the third embodiment. The same reference numerals in FIGS. 15A to 15C denote the same parts as in the third embodiment. In this embodiment, differences from the third embodiment will be mainly described.

FIGS. 15A to 15C are exploded views of the display 1 and the first and second phase shift elements 32A and 32B. Each of the first and second phase shift elements 32A and 32B is divided into a 6×6 matrix pattern, and the divided regions of each phase shift element can be independently driven.

In this embodiment, a stereoscopic image, a two-dimensional image, and images including both a stereoscopic image and a two-dimensional image can be displayed by the same method as in the first embodiment. On the other hand, when voltages are applied to none of the regions of the first phase shift element 32A, and predetermined voltages are continuously applied to all the regions of the second phase shift element 32B, a two-dimensional image can be displayed in the same principle as in the third embodiment.

When regions, belonging to identical horizontal rows, of the corresponding regions of the first and second phase shift elements 32A and 32B are simultaneously driven in synchronism with the switching operation of stripe images from the upper portion to the lower portion of the screen of the display 1, parallax barriers corresponding to the switching operation of stripe images from the upper portion of the screen can be formed on the polarization optical element 2 as in the second embodiment, thus displaying a higher-quality stereoscopic image which suffers less crosstalk between the right and left parallax images.

Furthermore, in this embodiment, when regions on the screen are designated using an input means such as a keyboard, mouse, or the like (not shown), a stripe image is displayed on the designated regions of the display 1, and the voltages to be applied to the regions, corresponding to the designated screen regions, of the first and second phase shift elements 32A and 32B are turned on/off in synchronism with the switching operation of stripe images on the designated regions of the display 1, a stereoscopic image can be displayed on the designated regions. On the other hand, when no voltages are applied to regions, corresponding to the designated regions, of the first phase shift element 32A, and predetermined voltages are continuously applied to regions, corresponding to the designated regions, of the second phase shift element 32B, a two-dimensional image, that is not a stripe image, can be displayed on the remaining screen regions of the display 1.

For example, in FIGS. 15A to 15C, regions $Q_1$ on the display 1 are designated to display a stereoscopic image, and a stripe image is displayed on these regions $Q_1$, i.e., a stereoscopic image is displayed. Also, the voltages to be applied to regions $Q_{32A}$ and $Q_{32B}$, corresponding to the regions $Q_1$, of the first and second phase shift elements 32A and 32B, are simultaneously turned on/off in synchronism with the switching operation of stripe images.

On regions $P_1$ other than the regions $Q_1$ of the display 1, a two-dimensional image is displayed. No voltages are applied to regions $P_{32A}$, corresponding to the regions $P_1$, of the first phase shift element 32A, and predetermined voltages are continuously applied to regions P$_{32B}$, corresponding to the regions P$_1$, of the second phase shift element 32B.

In this embodiment, as described above, the observer can designate the display regions of a stereoscopic image and a two-dimensional image.

Note that each of the first and second phase shift elements 32A and 32B need not always be divided into 6×6 regions unlike in this embodiment, but may be divided at arbitrary positions and shapes.

What is claimed is:

1. A stereoscopic image display method using a display for emitting light consisting of predetermined polarized light, a phase shift member which is arranged at a predetermined position in front of said display, and sets transmitted light in one of two different phase shift states in accordance with an electrical signal, and a polarization optical element which is arranged at a predetermined position in front of said phase shift member and is constituted by alternately arranging, in a horizontal direction, two different types of vertically elongated stripe-shaped polarization plates having orthogonal optical axes, comprising the steps of:

displaying, on said display, a single stripe image which is synthesized in such a manner that right and left parallax images from a parallax image source are divided into stripe pixels, and the stripe pixels of the right and left parallax images are arranged in a predetermined order; and controlling a direction of polarization of light transmitted through said phase shift member by controlling the electrical signal to be applied to said phase shift member in synchronism with changing-over of left and right image displays of said stripe image;

wherein when a polarization direction of light from said phase shift member lies in a first state of said different phase shifts, in an area having a first optical axis in said polarization optical element, the light is transmitted, and in an area having a second optical axis in said polarization optical element, the light is not transmitted; and wherein when a polarization direction of light from said phase shift member lies in a second state of said different phase shifts, in an area having a first optical axis in said polarization optical element, the light is not transmitted and in an area having a second optical axis in said polarization optical element, the light is transmitted;

whereby changing-over of parallax barriers by said stripe-shaped polarization plates is performed.

2. A method according to claim 1, further comprising the step of displaying, on said display, a stripe image synthesized by alternately arranging odd order stripe pixels of the stripe pixels obtained by dividing the right parallax image and even order stripe pixels of the stripe pixels obtained by dividing the left parallax image, and thereafter, displaying, on said display, a stripe image synthesized by alternately arranging even order stripe pixels of the stripe pixels obtained by dividing the right parallax image and odd order stripe pixels of the stripe pixels obtained by dividing the left parallax image.

3. A method according to claim 1, wherein the two different phase shift member include a phase shift state in which the direction of polarization of light polarized linearly in a predetermined direction rotates through a first predetermined angle when the predetermined linearly polarized light is transmitted through said phase shift member, and a phase shift state in which the direction of polarization of predetermined linearly polarized light rotates through a second predetermined angle when the predetermined linearly polarized light is transmitted through said phase shift member.

4. A method according to claim 3, wherein the first predetermined angle is substantially 90° and the second predetermined angle is substantially 0°.

5. A method according to claim 1, wherein said phase shift member comprises first and second phase shift elements which are arranged in a direction almost along light transmission with respect to said display and set transmitted light in two different phase shift states in accordance with electrical signals, and the two different phase shift states set by each of said first and second phase shift elements include a phase shift state in which the direction of polarization of predetermined linearly polarized light rotates through substantially 45° when the light polarized linearly in a predetermined direction is transmitted therethrough, and a phase shift state in which the direction of polarization of predetermined linearly polarized light is left unchanged when the predetermined linearly polarized light is transmitted through the phase shift element.

6. A method according to claim 5, further comprising the step of independently applying electrical signals to said first and second phase shift elements.

7. A method according to claim 1, wherein said phase shift member is divided into a plurality of regions, and said method further comprises the step of independently applying electrical signals to the divided regions.

8. A stereoscopic image display method, in which parallax images for right and left eyes from a parallax image source are divided into a plurality of stripe pixels, a stripe image obtained by arranging the plurality of stripe pixels in a horizontal direction in a predetermined order is displayed on a display, a light beam which comes from the stripe image displayed on said display and has a plane of polarization in a predetermined direction is guided to a polarization optical element constituted by arranged, in the horizontal direction, vertically elongated stripe-shaped polarization plates so that adjacent polarization plates have orthogonal optical axes, via a phase shift member which selectively sets incident light in one of two different phase shift states in accordance with an electrical signal and outputs the light, and the stripe image displayed on said display is observed using the light beam transmitted through said polarization optical element, comprising the steps of:

changing over left and right image displays of said stripe image; and changing the polarization state of the light beam transmitted through said phase shift member by controlling the electrical signal to be applied to said phase shift member in synchronism with the step of changing the polarization state;

wherein when a polarization direction of light from said phase shift member lies in a first state of said different phase shifts, in an area having a first optical axis in said polarization optical element, the light is transmitted, and in an area having a second optical axis in said polarization optical element, the light is not transmitted, and wherein when a polarization direction of light from said phase shift member lies in a second state of said different phase shifts, in an area having a first optical axis in said polarization optical element the light is not transmitted, and in an area having a second optical axis in said polarization optical element, the light is transmitted;

whereby changing-over of parallax barriers by said stripe-shaped polarization plates is performed.

9. A stereoscopic image display apparatus comprising:

a display for emitting light consisting of predetermined polarized light;

a phase shift member which is arranged at a predetermined position in front of said display, and sets transmitted light in one of two different phase shift states in accordance with an electrical signal;

a polarization optical element which is arranged at a predetermined position in front of said phase shift member and is constituted by alternately arranging, in a horizontal direction, two different types of vertically elongated stripe-shaped polarization plates having orthogonal optical axes;

a parallax image source for outputting right and left parallax images;

image processing means for dividing the right and left parallax images into stripe pixels, and displaying, on said display, a stripe image synthesized by arranging odd order stripe pixels of the stripe pixels obtained by dividing the right parallax image and even order stripe pixels of the stripe pixels obtained by dividing the left parallax image, or displaying, on said display, a stripe image synthesized by alternately arranging even order stripe pixels of the stripe pixels obtained by dividing the right parallax image and odd order stripe pixels of the stripe pixels obtained by dividing the left parallax image;

phase shift member drive means for applying the electrical signal to said phase shift member; and control means for controlling said image processing means to divide the right and left parallax images from said parallax image source into the stripe pixels and to display, on said display, a single stripe image synthesized by arranging the stripe pixels in a predetermined order, and controlling a direction of polarization of light transmitted through said phase shift member in synchronism with changing-over of left and right image displays of stripe image by controlling the electrical signal to be applied to said phase shift member using said phase shift member drive means;

wherein when a polarization direction of light from said phase shift member lies in a first state of said different phase shifts, in an area having a first optical axis in said polarization optical element, the light is transmitted, and in an area having a second optical axis in said polarization optical element, the light is not transmitted, and wherein when a polarization direction of light from said phase shift member lies in a second state of said different phase shifts, in an area having a first optical axis in said polarization optical element, the light is not transmitted, and in an area having a second optical axis in said polarization optical element, the light is transmitted;

whereby changing-over of parallax barriers by said stripe-shaped polarization plates is performed.

10. An apparatus according to claim 9, wherein the two different phase shift states set by said phase shift member include a phase shift state in which the direction of polarization of light polarized linearly in a predetermined direction rotates through a first predetermined angle when the predetermined linearly polarized light is transmitted through said phase shift member, and a phase shift state in which the direction of polarization of predetermined linearly polarized light rotates through a second predetermined angle when the predetermined linearly polarized light is transmitted through said phase shift member.

11. An apparatus according to claim 10, wherein the first predetermined angle is substantially 90° and the second predetermined angle is substantially 0°.

12. An apparatus according to claim 9, wherein said phase shift member comprises first and second phase shift elements which are arranged in a direction almost along light transmission with respect to said display and set transmitted light in two different phase shift states in accordance with electrical signals, and the two different phase shift states set by each of said first and second phase shift elements include a phase shift state in which the direction of polarization of predetermined linearly polarized light rotates through substantially 45° when the predetermined linearly polarized light is transmitted through the phase shift element, and a phase shift state in which the direction of polarization of predetermined linearly polarized light is left unchanged when the light polarized linearly in a predetermined direction is transmitted therethrough.

13. An apparatus according to claim 12, wherein said phase shift member drive means comprises means for independently applying electrical signals to said first and second phase shift elements.

14. An apparatus according to claim 9, wherein said phase shift member is divided into a plurality of regions, and said phase shift member drive means comprises means for independently applying electrical signals to the divided regions.

* * * * *

UNITED STATES PATENT AND TRADEMARK OFFICE
CERTIFICATE OF CORRECTION

PATENT NO. : 5,875,055
DATED : February 23, 1999
INVENTOR(S) : Hideki Morishima et al.

It is certified that error appears in the above-indentified patent and that said Letters Patent is hereby corrected as shown below:

Column 5, line 66, delete "for n-shifting" and insert therefor -- for $\pi$-shifting --.

Column 7, line 9, delete "$L_s$ or" and insert therefor -- $L_s$, or --.

Column 7, line 21, delete "the n cell" and insert therefor -- the $\pi$ cell --.

Column 8, line 1, delete "the r cell" and insert therefor -- the $\pi$ cell --.

Column 8, line 36, delete "image 1 obtained" and insert therefor -- image 11' obtained --.

Column 8, line 55, delete "$R_2$, $R_4$, $R_6$, ..." and insert therefor -- R2, R4, R6 ...--.

Column 11, line 2, delete "the r cell" and insert therefor -- the $\pi$ cell --.

Column 12, line 39, delete "an angle a" and insert therefor -- an angle $\alpha$ --.

Column 12, line 46, delete "$\theta-(\alpha-\theta)=2\cdot\theta-60$" and insert therefore -- $\theta-(\alpha-\theta)=2\cdot\theta-\alpha$ --.

Signed and Sealed this

Twenty-eighth Day of September, 1999

Attest:

Q. TODD DICKINSON

*Attesting Officer*     *Acting Commissioner of Patents and Trademarks*